United States Patent

Linton

[15] 3,639,133

[45] Feb. 1, 1972

[54] PROCESS FOR MAKING SILICA-COATED LEAD CHROMATE PIGMENTS AND PRODUCT THEREOF

[72] Inventor: Howard R. Linton, Scotch Plains, N.J.

[73] Assignee: E. I. du Pont de Nemours and Company, Wilmington, Del.

[22] Filed: Oct. 23, 1970

[21] Appl. No.: 83,674

Related U.S. Application Data

[63] Continuation of Ser. No. 681,323, Nov. 8, 1967, abandoned.

[52] U.S. Cl............................................106/298, 106/308 B
[51] Int. Cl................................................................C09c 1/20
[58] Field of Search.........................................106/298, 308 B

[56] References Cited

UNITED STATES PATENTS

| | | | |
|---|---|---|---|
| 2,296,638 | 9/1942 | Hanahan | 106/298 |
| 2,885,366 | 5/1959 | Iler | 106/308 B |
| 3,370,971 | 2/1968 | Linton | 106/298 |
| 3,437,502 | 4/1969 | Werner | 106/308 B |

Primary Examiner—James E. Poer
Attorney—Frank R. Ortoloni

[57] ABSTRACT

Silica-coated lead chromate pigments having improved stability in use under abrasive conditions are prepared by processes in which the lead chromate pigment particles, in a liquid slurry, are subjected to intense shear to break up agglomerates, and are thereafter coated with dense silica, optionally in combination with alumina.

14 Claims, 5 Drawing Figures

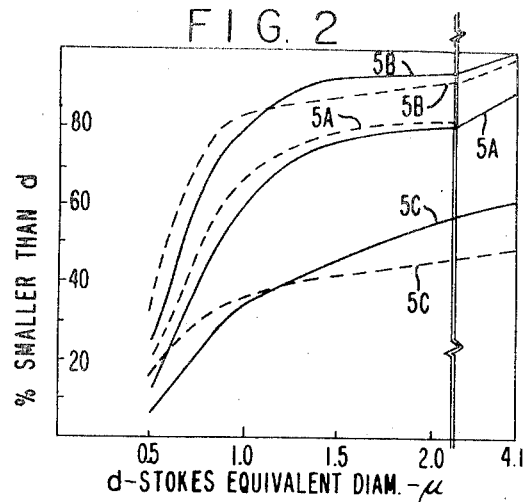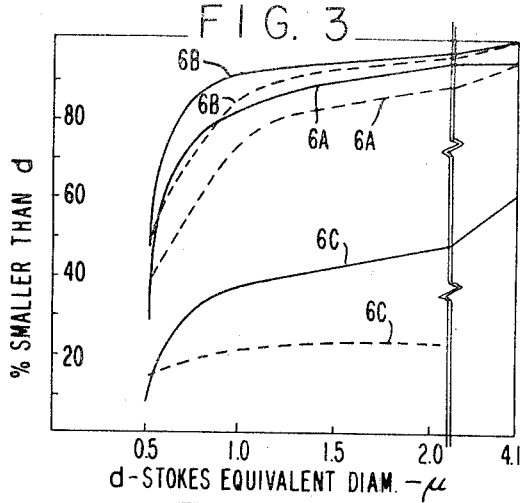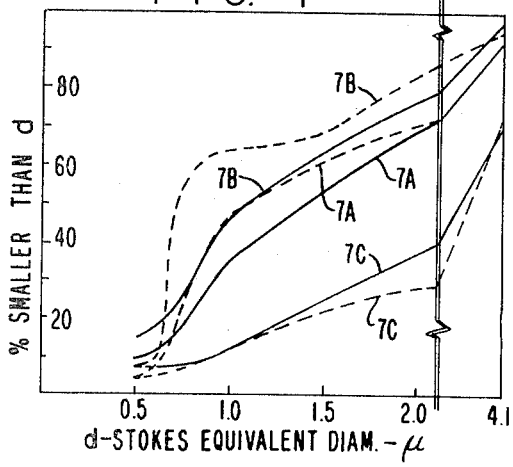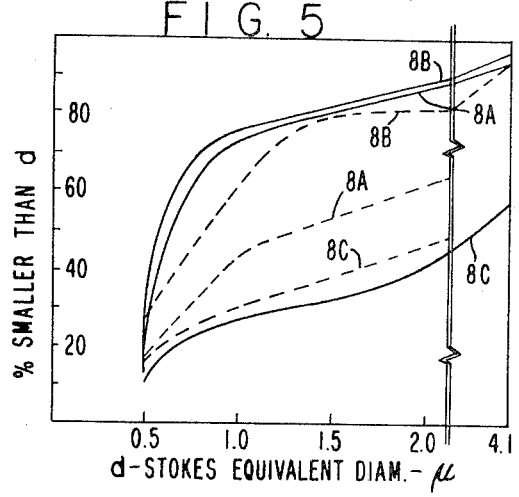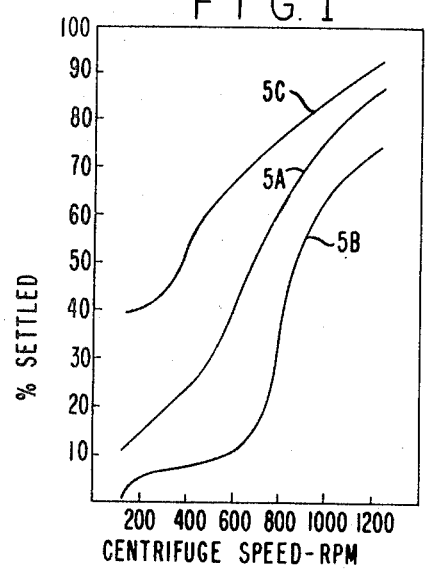
INVENTOR
HOWARD R. LINTON
BY Fred C. Carlson
ATTORNEY

PROCESS FOR MAKING SILICA-COATED LEAD CHROMATE PIGMENTS AND PRODUCT THEREOF

This application is a continuation of application Ser. No. 681,323, filed Nov. 8, 1967, and now abandoned.

BACKGROUND OF THE INVENTION

1. Field of the Invention

The invention pertains to improvements in the field of coated pigments, especially pigments for use in paints and plastics.

2. Description of the Prior Art

U.S. Pat. No. 2,885,366, issued May 5, 1959 to Ralph K. Iler, describes products "comprising a skin of dense, hydrated amorphous silica bound upon a core of another solid material and process of making same," and U.S. Pat. No. 2,913,419, issued Nov. 17, 1959 to Guy B. Alexander, describes "a product composed of a dense skin of amorphous silica, containing aluminum, chemically bound upon a core of another solid material." In my copending U.S. application Ser. No. 555,954, filed June 8, 1966, now U.S. Pat. No. 3,370,971, I have described lead chromate pigments coated with dense amorphous silica or silica and alumina.

While for many uses the pigments described in my U.S. Pat. No. 3,370,971 have excellent stability against heat and chemical attack, I have found that when such pigments are used under circumstances wherein they are subjected to abrasive action in liquid media, such as when they are ball-milled into paint formulations, their light and chemical stability is lost to a considerable degree. The reason for such loss was not readily apparent, and it was not evident how it could be corrected.

SUMMARY

Now according to the present invention it has been found that the above-mentioned loss of stability of silica-coated lead chromate pigments can be overcome, and pigments of excellent stability produced, by processes in which the lead chromate pigment, prior to coating with silica, is subjected in liquid slurry to conditions of intense shear. It appears that the shearing forces break up aggregates or agglomerates of the original pigment particles, thereby permitting a more effective coating by the silica and avoiding the presence of coated pigment agglomerates which can break up later during use of the coated product; the invention is not, however, limited by this or any other particular explanation, but only by the appended claims.

BRIEF DESCRIPTION OF THE DRAWINGS

In the drawings:

FIG. 1 is a graph showing the percentage of a lead chromate pigment, Chrome Yellow (CI-77600) settled from an aqueous, centrifuged suspension thereof, plotted against centrifuge speeds, for three conditions of preparation, viz, stirring (control), colloid-milling, and homogenizing, and FIG. 2 is a graph of the percent by weight of solid particles smaller than a specified diameter $d$, plotted against Stokes Equivalent Diameters $d$ (in microns, $\mu$), for the data of FIG. 1, the solid lines representing data for particles before silica coating and broken lines data on the wet silica-coated products.

FIGS. 3, 4 and 5 are graphs similar to FIG. 2 but for data of the examples on Molybdate Orange (CI-77605), Molybdate Red (CI-77605), and Lead Sulfochromate (CI-77603), respectively.

DESCRIPTION OF PREFERRED EMBODIMENTS

In common with the invention of the above-mentioned U.S. Pat. No. 3,370,971, the products of the present invention are achieved by encapsulating the particles of lead chromate pigment with a coating of dense amorphous silica. This coating has greater chemical and thermal resistance than the lead chromate itself. It effectively envelops the lead chromate particles and protects them from reaction with destructive chemicals, such as acids and sulfides. When the coated pigments are used for the coloration of high-temperature molding plastics the coating effectively protects the lead chromate particles from decomposition at the elevated temperatures of molding and from reaction with the resin vehicle. The dense, amorphous silica of the coating optionally may be combined with alumina.

According to the present invention, to insure maximum effectiveness of the coating treatment, the slurry of particulate, pigmentary material to be coated is subjected to intense shear to disperse pigment clusters and aggregates prior to depositing the coating thereon. This processing improvement results in a product which is less susceptible to the loss of the protective effects of the coating when the coated pigment is processed under conditions which subject the coating to abrasive action.

The term "lead chromate pigments," as used herein, refers to a group of well-known inorganic pigments which are widely used primarily because of their excellent hiding power and relatively low cost. These include the following, all references being to the "Colour Index," 2nd Edition, 1956, published jointly by the Society of Dyers and Colourists, England and the American Association of Textile Chemists and Colorists, United States:

Chrome Yellow CI-77600,
Basic Lead Chromate CI-77601,
Lead Sulfochromate CI-77603, and
Molybdate Orange or Red CI-77605.

The color of these pigments is due primarily to lead chromate present therein. Likewise, many of their shortcomings are also attributable to the properties inherent in this component. Among these may be mentioned:

1. Sensitivity to alkalies and acids, resulting from solubilizing the chromate ion,
2. Staining in the presence of sulfides, resulting from formation of black lead sulfide, and
3. Darkening on exposure to light or to elevated temperatures, resulting from reduction of hexavalent chromium to the trivalent state.

Past attempts to overcome these deficiencies usually involved treating the pigments, either to chemically neutralize the attacking agent and render it temporarily ineffective, or to physically bar its access to the sensitive pigment particle. The claimed improvements, although very frequently demonstrable, have been only of academic interest, since their effectiveness is not adequate to permit the use of these pigments in those applications where their inherent shortcomings are so serious as to preclude their use. Thus, for example, lead chromate pigments cannot be widely used for the coloration of linoleum, because there would be serious color change where the surface is exposed to alkaline detergents, soap, dilute acetic acid (vinegar) or other agents to which lead chromate is sensitive. Similarly, the use of these pigments as ingredients of paints or other coating compositions which might be exposed to hydrogen sulfide fumes would be precluded, because such exposure would result in undesirable staining and darkening. Likewise, presently available lead chromate pigments cannot be used for the coloration of high-temperature molding plastics (for example, polystyrene, polyethylene, polypropylene, etc.), because of the serious discoloration and darkening undergone by the pigment at the relatively high molding temperatures (200°–320° C.) normally encountered in processing. In short, the effectiveness of a treatment to overcome the deficiencies inherent in lead chromate pigments must be judged by the extent to which the utility of such pigments has been increased, and in particular the degree to which there has been penetration into fields of application hitherto closed to these pigments.

In the normal use of pigments for the coloration of thermoplastic resins, such as polystyrene, polyethylene, etc., the dry pigment is first mixed with the solid granular resin, and this mixture is subjected to vigorous stirring until homogeneity is attained. This operation may be performed in a wide variety of equipment, such as a ribbon blender, a Banbury Mixer, a Baker-Perkins Mixer, by drum tumbling (that is tumbling end-over-end in a closed drum), etc. In all these operations, which are common today in the plastics industry, such rigorous handling can actually result in the rupture or removal to varying degrees of the silica or silica-alumina coating from the lead chromate pigment, with resultant deterioration in chemical, thermal, and light resistant of the pigment.

The decreased chemical and thermal resistance of coated pigments which have been subjected to the aforementioned abrasive action is believed to be due largely to fracture of coated clusters or agglomerates of pigment particles, whereby reactive, uncoated pigment surfaces are exposed. In normal pigment manufacture such clusters or agglomerates of pigment particles are quite common in aqueous pigment presscake wherein the pigment has never been subjected to a drying step, as well as in slurries prepared by mixing pulverized dry pigment with water. These clusters are not eliminated by normal agitation of the type employed in conventional pigment manufacture. Even the use of high-speed agitation or the employment of baffles fails to eliminate them completely. Application of any of the coating techniques discussed above entails coating clusters or agglomerates of pigment particles, as well as the preferred, well-dispersed pigment particles per se. To insure the maximum protective action of the coating independent of the subsequent conditions of use of the coated pigment, it is essential that the coating be applied directly to the well-dispersed pigment particles, and not to agglomerates thereof. The processing refinement which permits the realization of this goal is the subject of the instant invention.

In a preferred embodiment of the invention, an aqueous slurry of lead chromate pigment, to which has been added a dilute aqueous solution of sodium silicate, is subjected to intense hydraulic shear. A suitable unit for this purpose is a homogenizer containing a small orifice which is closed by a spring-loaded valve. When a fluid mass under sufficient pressure to open the valve is forced into the orifice, it is passed between the surface of the valve and the valve seat and is thus subjected to intense shearing action. Around the opening, which is created when the valve opens, is an annular surface having a diameter just slightly larger than that of the opening. After the fluid mass under pressure passes through the valve opening, it impinges on this annular surface at approximately a right angle, thus serving to further break up pigment agglomerates. The pressure drop through this zone of intense shear should be between 1,000 and 10,000 p.s.i. A preferred range is 2,000–8,000 p.s.i., and a pressure drop of about 5,000 p.s.i. normally produces optimum results. Such devices are conventional and well known, particularly in the art of preparing emulsions.

The homogenized slurry is heated, whereupon formation of a continuous silica coating is initiated on the particles of the pigment. Thereafter an aqueous solution of sodium aluminate or aluminum sulfate is added, the pH is adjusted in the latter case to 9.0 to 9.5 and heating is continued, thus altering the composition of the coating so that it consists of an intimate combination of silica and alumina. Alternatively, in perhaps the most practical mode, the initial deposition of the silica coating on the pigment particles can be effected by the addition of dilute sulfuric acid to the suspension of pigment in sodium silicate solution, and this step then followed by the previously mentioned treatment to deposit alumina. In either case, isolation of the product involves filtration, washing, drying and pulverizing, all of which steps are conventional. It is understood, of course, that the steps of drying and grinding may be omitted and the coated pigment product used as an aqueous paste or slurry in subsequent applications.

It is important to effect deposition of the silica coating upon the pigment particles as soon as practicable after the deagglomeration step, since the particles have a tendency toward reagglomeration upon standing or drying. The presence of a dispersant, e.g., sodium silicate or tetrasodium pyrophosphate, helps to minimize this tendency.

The following examples illustrate this invention in detail, but they are not intended to establish limits except as specified. The term "parts," as used herein, refers to parts by weight.

EXAMPLE 1

A slurry of 450 parts of Chrome Yellow pigment (CI–77600) in 3,000 parts of water was stirred to uniformity at room temperature. To this was added with stirring 30 parts of sodium silicate solution (Du Pont's No. 20WW grade, containing 28.4% $SiO_2$ by analysis; $SiO_2/Na_2O$ ratio = 3.25). The suspension was passed once through a homogenizer (Model SMD 15M–8TA of Manton-Gaulin Manufacturing Company) at 5,000 p.s.i. to break up any pigment agglomerates present in the slurry. The homogenizer was washed with 750 parts of water to remove any residual pigment in the equipment, the washings being added to the original homogenized slurry. A 1,410-part portion of the combined slurry was heated to 90°–95 C. over a 30-minute period and the pH adjusted to 9.0–9.5 by the addition of sodium hydroxide solution if necessary. The following two solutions were then added simultaneously with stirring, each at a uniform rate of approximately 3 parts per minute:

1. 125 parts of sodium silicate solution, as described above, diluted with water to a volume equivalent to 600 parts of water, and
2. 17.3 parts of 96 percent sulfuric acid diluted with water to a volume corresponding to 800 parts of water.

The slurry was stirred for 15 minutes additional, following which 20 parts of hydrated aluminum sulfate ($Al_2(SO_4)_3 \cdot 15H_2$) was added. The pH was adjusted to 6.0–6.5 with sodium hydroxide solution and agitation continued for a few minutes longer. The thus-coated pigment was isolated in conventional manner by filtration, washing free of sulfate, and drying at 80° C. The dried product was micropulverized prior to testing.

The coated product was compared with a corresponding product prepared in identical manner from the same starting material except for the omission of the homogenization step. Conventional rubout tests in lithographic varnish showed the homogenized product to possess a 15–20 percent advantage in strength by comparison with the unhomogenized control.

For evaluation of thermal stability in molding resin, a mixture of 1 part of pulverized pigment and 100 parts of dry polystyrene granules was blended to uniformity in a closed can of such size that the charge occupied approximately one-fourth of the volume thereof. The closed can and contents were subjected to rolling for 10 minutes on mechanical rollers at 138 r.p.m., an abrasive type of mixing, and the mixture was tested by injection molding at 200° C. and 320° C. The lack of degradation in the pigment during the dry-mixing operation was determined by noting the lack of color difference between the resin extruded at 200° C. and that molded at 320° C., at which temperature marked interaction between the lead chromate and resin would have occurred, unless the surface of the lead chromate had been adequately protected by a suitable coating. By this test the improved pigment prepared in accordance with Example 1 gave a product which on injection molding at 320° C. was only slightly darker than the corresponding product molded at 200° C. The products from the control pigment prepared in identical manner but without the use of homogenization, by contrast, showed severe darkening at 320° C. in comparison with the counterpart molded at 200° C. This test demonstrates dramatically the tremendous improvement in heat stability realizable as a result of subjecting the pigment slurry to high shear prior to actual deposition of the coating thereon.

EXAMPLE 2

The procedure of Example 1 was repeated, except that Molybdate Orange (CI–77605) was substituted for the Chrome Yellow. The resulting homogenized pigment showed similar advantages in strength and heat stability on injection molding in polystyrene by comparison with the corresponding control prepared in identical manner except that the homogenization step was omitted.

EXAMPLE 3

The procedure of example 1 was repeated, except that lead sulfochromate (CI-77603) was substituted for the Chrome Yellow. The resulting pigment showed similar advantages in strength by rubout in lithographic varnish and in heat stability by injection molding in polystyrene, in comparison with the corresponding control which had not been subjected to the homogenization step.

EXAMPLE 4

In the following experiments products were prepared under various conditions of shear and were compared with their counterparts in which no shearing force was applied.

A. A slurry of 150 parts of dry pulverized Chrome Yellow pigment (CI-77600) in 1,250 parts of water was stirred to uniformity at room temperature. To this was added, with stirring, 20 parts of sodium silicate solution (as described in Example 1), and stirring was continued for 5 minutes. The slurry was run through a colloid mill (Model No. 2F, Manton-Gaulin Manufacturing Company) set at a clearance of 0.005 inch (calculated to provide a shear force of approximately 0.1 p.s.i.). The slurry was heated externally to 88°–92° C. and the pH adjusted to 9.0–9.5 with dilute sodium hydroxide solution. The following two solutions were then introduced simultaneously with stirring at a uniform rate:

1. 112 parts of sodium silicate solution, as described above, diluted with water to a volume equivalent to 600 parts of water, added over a period of 4 hours, and
2. 17.3 parts of sulfuric acid (96 percent) diluted with water to a volume equivalent to 800 parts of water, added over 5 hours.

Stirring was continued for 15 minutes at 88°–92° C., following which a solution of 10 parts of hydrated aluminum sulfate ($Al_2(SO_4)_3 \cdot 15H_2O$) in 100 parts of water was added. The pH was adjusted to 6.0–7.0 with dilute sodium hydroxide and stirring continued for 10 minutes longer. The product was isolated in conventional manner, as described in Example 1.

B. The procedure of Example 4A was repeated, except that in lieu of colloid milling the slurry was passed through a homogenizer (as in Example 1) at 5,000 p.s.i.

C. The procedure of Example 4B was repeated, except that the homogenizer was set at 8,000 p.s.i.

D. The procedure of Example 4A was repeated, except that the pigment slurry was not passed through a colloid mill nor any other equipment to provide a high shearing force.

E. The procedure of Example 4A was repeated, except that the slurry, following passage through the colloid mill, was passed through a homogenizer (as in Example 1) at 5,000 p.s.i.

F. The procedure of Example 4A was repeated, except that the slurry, after passage through the colloid mill, was passed through a homogenizer at 8,000 p.s.i.

The products obtained in this example were evaluated by conventional rubout in lithographic varnish to assess their relative strengths. In addition, their suitability for use in high-temperature molding resins was evaluated by the following abrasion resistance and heat stability test.

A mixture of 0.5 g. of pulverized pigment and 50 g. of granular polystyrene ("Styron Sugar," 666-27-22, ex Dow Chemical Company) in a closed ½-pint can was shaken for 2 minutes in a paint shaker (the "Red Devel" Paint Conditioner, manufactured by Red Devil Tools, Irvington, N.J.). The resulting mixture was heated at 315±10° C. for 20 minutes, and then extruded into a mold. To assess heat stability the color of the chip so obtained was compared with its counterpart heated to a lower temperature (200° C.). In the following table an arbitrary numerical rating has been assigned to characterize the heat stability in plastics as determined by this test. A numerical rating of 10 indicated no detectable color change on comparison of the material, injection molded at the higher temperature, with its counterpart molded at the lower temperature of 200° C. By contrast, a rating of 0 denotes the degree of color change observed in the uncoated pigment. The results of the evaluation are summarized in the following table:

| Sample No. | Method of dispersion | Strength by Rubout | Heat stability on injection molding |
|---|---|---|---|
| A | Colloid-milled | 5% strong | 5 |
| B | Homogenized at 5000 p.s.i. | 13% strong | 6 |
| C | Homogenized at 8000 p.s.i. | 17% strong | 7 |
| D | Control (simple standard | | 2 |
| E | Colloid-milled and homogenized at 5000 p.s.i. | 17% strong | 6.5 |
| F | Colloid-milled and at 8000 p.s.i. | 20% strong | 7 |

The foregoing results clearly indicate that within practical limits the degree of improvement in strength by rubout and in color stability on injection molding are directly proportional to the shear force applied in the dispersion of the pigment slurry prior to the application of the coating.

The rate of strength development of the products was compared by dispersing them in lithographic varnish and assessing the strengths of the resulting inks after varying amounts of work were performed on the system. For this purpose a Hoover mechanical muller was used and the pressures applied to the circular glass plates was constant throughout. The number of mulls applied to each ink is shown in the table, the designation 2×50, for example, meaning that the ink was given 50 mulls then picked up with a spatula, spread out again on the muller plate, and given an additional 50 mulls. In each case the ink which had been mulled 5×50, a total of 250 mulls was used as a standard of reference, and the strength developed by inks subjected to less mulling was expressed as a percentage of the strength obtained in the ink from maximum mulling. The following table summarizes the results:

Rate of Strength Development in Lithographic Varnish

| Sample | Treatment | Number of Mulls | | | |
|---|---|---|---|---|---|
| | | 1×25 | 1×50 | 2×50 | 5×50 |
| D | Control (no colloid-milling or homogenization) | 76 | 83 | 85 | 100 |
| A | Colloid-milled | 98 | 98 | 99 | 100 |
| C | Homogenized at 8,000 p.s.i. | 100 | 100 | 100 | 100 |
| F | Colloid-milled and Homogenized at 8,000 p.s.i. | 100 | 100 | 100 | 100 |

These results indicate the remarkable rate of strength development in those products which had been subjected to intensive shear prior to deposition of the coating on the pigment particles. From a practical standpoint, it is concluded that inks of satisfactory fineness can be manufactured from such products with a minimum of work to disperse the pigment to the desired degree, whereas considerably more work would be required to attain the same results in the case of the control from the pigment which had not been subjected to any shearing action.

Enamels were prepared by dispersing the pigments in conventional fashion either by ball-milling or by sand-milling in a typical alkyd vehicle. Gloss comparisons were made at 20°, following the ASTM method D523–62T, as described in "1966 Book of ASTM Standards," Part 21, pages 105–108, American Society for Testing Materials, Philadelphia, Pa. The results are summarized in the following table:

20° Gloss in Alkyd
(ASTM Method D523–62T)

| Sample | Treatment | Gloss |
| --- | --- | --- |
| Chrome Yellow (CI–77600) | Standard—No coating | 60 |
| D | Coated control (no colloid-milling or homogenization) | 12 |
| A | Colloid-milled | 38 |
| B | Homogenized at 5000 p.s.i. | 57 |
| C | Homogenized at 8000 p.s.i. | 63 |

These data clearly show that the deposition of the coating on the Chrome Yellow, as indicated by Sample D, ordinarily results in a marked decrease of gloss to a degree which would render such a product unacceptable for use in an alkyd paint application where this property is important. However, elimination of pigment agglomerates prior to coating (as was done by applying high shear in Samples A, B and C) results in a remarkable recovery of gloss, so that the gloss obtained from the coated products can actually equal, if not exceed, that of the standard uncoated product. The enamels prepared from the coated product, of course, retain the earlier described advantages in chemical resistance, heat stability, etc., which are attributable to the protective action of the coating on the surface of the pigment particles.

EXAMPLE 5

The following experiment was designed to determine the nature of the change undergone by the pigment slurry upon subjecting it to shear forces of the type discussed above.

A. An aqueous slurry of Chrome Yellow (CI–77600) was colloid-milled exactly as in Example 4A. Immediately following the colloid-milling, the slurry was split into 10 equal parts and each was centrifuged for 5 minutes at varying speeds, ranging from 150 to 1,250 r.p.m. (equivalent to forces of 4 to 316 $g$). The unsettled slurry in the centrifuge tubes was then decanted, dried and weighed. The settled portion was removed from the tube, washed, dried and weighed.

B. The procedure of Example 5A was repeated, except that the pigment slurry was homogenized at 5,000 p.s.i. (as in Example 4B).

C. The procedure of Example 5 A was repeated, except that the pigment slurry was not subjected to any shear (as in Example 4D). The data are presented graphically in FIG. 1, and clearly indicate that the quantity of solid settled decreases in direct proportion to the shear force applied to the pigment slurry. These results confirm the above-proposed explanation of the functioning of the present invention, in that the incidence of clusters or agglomerates in the pigment slurry as highest in Sample 5C and least in Sample 5B, which has been subjected to the more intensive shearing action of the homogenizer.

It is possible by the use of recognized mathematical equations based on Stokes Law and adapted for application to centrifugal action (See R. D. Cadle, "Particle Size Determination," Interscience Publishers, Inc., New York, 1955, p. 228) to express these results in terms of "Stokes Equivalent Diameters" of the pigment particles. The data of the aforementioned FIG. 1 were utilized for this purpose, and the results are presented in FIG. 2. In this plot the ordinate indicates the percent by weight of solid particles smaller than the diameter $d$ specified, and the abscissa indicates the Stokes Equivalent Diameter, $d$, expressed in microns ($\mu$), for data on size of particles before silica coating (solid lines) and after silica coating but before drying (broken lines). The presentation of the data in this manner permits the following conclusions on the effect, on lead chromate particle size, of the shearing action.

1. In the homogenized Sample (5B) more than 90 percent of the particles are smaller than $1.4\mu$.
2. In the colloid-milled Sample (5A) approximately 75 percent of the particles are smaller than $1.4\mu$.
3. In the control Sample (5C) about 40 percent of the particles are in this category.

Other conclusions which may be drawn from FIG. 2 are that the homogenized sample (5B) contains no lead chromate pigment particles larger than $4.1\mu$, the colloid-milled Sample (5A) contains only about 10 percent of particles larger than $4.1\mu$, while the control Sample (5C) contains close to 40 percent of particles larger than $4.1\mu$.

EXAMPLE 6

The procedure of Example 5 was repeated, except that the pigment used was a typical Molybdate Orange (CI–77605), characterized by its relatively light masstone, yellow shade and strong tint. The results are plotted in FIG. 3. From these data it is clear that both the homogenized and the colloid-milled samples are predominantly (approximately 90 percent) of a particle size less than $1.4\mu$. Also they contain no more than about 5 percent of particles larger than $4.1\mu$. In the case of the control, which had not been subjected to intensive shearing action prior to coating, less than 40 percent of the particles were smaller than $1.4\mu$ and approximately 40 percent were larger than $4.1\mu$.

EXAMPLE 7

The procedure of Example 5 was followed, except that the pigment used was a red shade of Molybdate Orange (CI–77605), frequently referred to as Molybdate Red. This pigment is considerably darker in masstone, redder in shade, and weaker in tinting strength than the orthodox Molybdate Orange used in Example 6. These differences are largely ascribable to the considerably larger average particle size of the Molybdate Red. The results are plotted in FIG. 4. The data demonstrate that approximately 60 percent of the particles of the homogenized sample and 50 percent of the colloid-milled counterpart are smaller than $1.4\mu$. In both cases less than 10 percent of the particles are larger than $4.1\mu$. By contrast, in the untreated control approximately 20 percent of the particles are less than $1.4\mu$ and approximately 30 percent are larger than $4.1\mu$.

EXAMPLE 8

The procedure of Example 5 was followed, except that the pigment used was a lead sulfochromate (CI–77603), commonly characterized as Primrose Yellow. The results are plotted in FIG. 5.

The data demonstrate that in both the homogenized and colloid-milled samples approximately 80 percent of the particles are smaller than $1.4\mu$ and less than 5 percent larger than $4.1\mu$. In the case of the control which had not been subjected to intensive shear prior to coating, approximately 30 percent of the particles are smaller than $1.4\mu$ and approximately 40 percent larger than $4.1\mu$.

EXAMPLE 9

Particle size analyses were made on products of Examples 5 to 8, inclusive, before and after coating with silica as taught in the examples. Results are tabulated as follows:

Particle Size Analyses—%

|  | Before silica coating | | After silica coating | |
| --- | --- | --- | --- | --- |
|  | <1.4μ | >4.1μ | <1.4μ | >4.1μ |
| Example 5—Medium yellow | | | | |
| Homogenized | >90 | 0 | >85 | <5 |
| Colloid-milled | 75 | 10 | 80 | — |
| Control | 40 | 40 | 40 | 55 |
| Example 6—Molybdate orange | | | | |
| Homogenized | >90 | <5 | >90 | <5 |
| Colloid-milled | 90 | 5 | >80 | 5 |
| Control | <40 | 40 | 20 | — |
| Example 7—Molybdate red | | | | |
| Homogenized | 60 | <5 | >65 | <10 |
| Colloid-milled | 50 | <10 | 60 | <10 |
| Control | 20 | 30 | 20 | 30 |
| Example 8—Primrose yellow | | | | |
| Homogenized | 80 | <5 | 80 | 5 |
| Colloid-milled | 80 | <5 | 50 | — |
| Control | 30 | 40 | 35 | — |

The above data are used in plotting the curves of FIGS. 2 to 5. Generally, it will be noted that the relative relationships of the curves for the coated products are essentially similar to each other as they were for the corresponding counterparts just prior to coating. Although in some cases there may appear to be significant divergence, nevertheless a summation of the data at the selected points of reference indicate the conclusions stated above regarding uncoated particles also apply to the wet silica-coated products obtained therefrom.

Lead chromate pigments have been known and widely used for many years, and are available in a broad range of shades. Of the preferred lead chromate pigments for treatment in accordance with this invention, there is, on the one hand, the very green shade "Primrose Yellow" in rhombic crystal form. A relatively pure lead chromate in monoclinic crystal form is much redder and is commonly known as "Medium Yellow." Intermediate shades are available in solid solutions of lead chromate and lead sulfate usually in monoclinic form. At the other extreme is a series of solid solutions of lead chromate, lead sulfate and lead molybdate in tetragonal crystal form which are oranges or even yellowish reds commonly known as "Molybdate Oranges" or "Molybdate Reds."

Three methods of applying the silica coating are illustrated in the examples of the above-mentioned patent application Ser. No. 555,954, viz, (1) simultaneous but separate addition of a soluble silicate and a mineral acid, (2) addition of a silicic acid solution freshly prepared by deionizing a sodium silicate solution with a cation-exchange resin, and (3) addition of sodium silicate solution of the pigment slurry, followed by addition of sulfuric acid. Details of said methods disclosed in application Ser. No. 555,954 are incorporated herein by reference.

There are certain critical conditions which must be observed during the treatment by any of these three methods. To obtain the desired dense silica coatings on the deagglomerated pigment particles, the pH of the slurry at the point of addition of the silica-forming ingredients to the mixture must be at least above pH 6.0 and preferably in the range of 9.0 to 9.5. Furthermore, the temperature at this same point must be at least above 60° C. and preferably above 75° C. In many cases it is preferred that the temperature be about 90° C. When the pH is allowed to go below about 6.0 or the temperature significantly below 60° C., there is a pronounced tendency for the silica to precipitate in an undesired porous, gellike structure.

The above-mentioned methods all result in the deposition of at least the major part of the silica as the desired amorphous continuous film on the surface of the pigment particles in the slurry. In all of these methods it is assumed that the pigment particles have been deagglomerated by intense shear and are well dispersed in sufficient water to give a fluid, easily stirrable starting slurry. Such a slurry can result directly from the preparation of the pigment as described followed by suitable washing, or it can be a reconstituted slurry made either by redispersing a washed filter cake or by dispersing a dry pigment in water. A convenient starting slurry can contain approximately 25 percent pigment, the balance being water, but this concentration is not critical.

It is common for lead chromate pigments to be finished slightly on the acid side, and when such pigments are reconstituted to form the starting slurry an alkaline treatment is necessary to achieve the desired pH at the point of subsequent treatment. Such an alkaline treatment can employ any convenient alkali, such as ammonium hydroxide or sodium hydroxide, unless the use of a strong alkali such as sodium hydroxide is precluded by the sensitivity thereto of the lead chromate pigment to be coated. A still more convenient method is to add a small amount of a sodium silicate solution; this achieves the desired alkalinity and tends to improve the dispersion of the pigment particles in the slurry. In such a treatment, care should be exercised not to exceed a pH of about 11.0 lest the lead chromate be somewhat solubilized. The sodium silicate solution used in such an addition as well as in the subsequent treatment steps is a commercial product widely available with a $SiO_2/Na_2O$ ratio of about 3.25 and a $SiO_2$ content of 28.4 percent. Such a product is convenient but not essential, and other sodium silicate solutions can be used as available. It is desirable, however, that the sodium ion content ($Na^+$) be kept low, since a high sodium ion content tends to cause gelation of silicic acid.

The above mentioned methods of forming the silica layer on the surface of the lead chromate pigment particles have one feature in common, viz, that the silica is added as "active silica." When sodium silicate is acidified, silicic acid is formed, probably initially as orthosilicic acid, $Si(OH)_4$. However, this product tends to polymerize by the reaction of two silanol groups

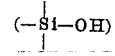

to form a siloxane group

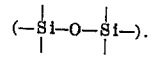

Under acidic conditions, this polymerization proceeds rapidly until a predominant proportion of the silanol groups present have been used up in the formation of siloxane bonds. The polymer thus formed has a high molecular weight and is defined as "inactive." Under the conditions of moderate alkalinity used in the examples below, there is a low degree of polymerization wherein the condensation between silanol groups has proceeded to only a limited extent leaving the silica in an "active" form which readily deposits on the surface of the lead chromate particles present. It is not intended to imply that there is no polymerization nor that the process of polymerization is completely inhibited but, under the conditions specified, the silica is in a state of low polymerization and, thus "active," for a sufficient time to bring about deposition in the dense, amorphous form on the surface of the lead chromate pigment particles. This term "active silica" has been more precisely defined elsewhere (see Rule U.S. Pat. No. 2,577,484 for instance), but the conditions specified above are adequate for the purposes of this invention.

The quantity of silica to be applied in the pigment treatment can be varied over a considerable range depending on the intended end use of the pigment. For use in extruded hot thermoplastic resins where relatively high temperatures (200°–320° C.) are encountered, higher amounts, from 15 to 32 percent of silica, are desirable. There seems to be no great advantage in exceeding about 32 percent, but amounts up to about 40 percent of the final pigment can be used with some advantage in resistance to the heat treatment, but with some loss in color properties. Amounts less than 15 percent show a noticeable improvement over the untreated product but may lack the desired heat resistance. For other uses, however, such products with lower silica have real value, notable for resistance of coating compositions made therefrom to chemical treatment and to exposure to light. In such applications, as little as 2 percent of dense amorphous silica coatings on lead chromate pigments show real improvements over the untreated counterparts. Thus, for purposes of this invention, in its broadest aspects the dense amorphous silica coating should be in the range of about 2 percent to 40 percent by weight of the final pigment. When alumina is also present, the quantity of $Al_2O_3$ can be varied from 0.25 percent to 2 percent by weight of the final pigment Two types of equipment have been shown in the examples as suitable to break down pigment agglomerates prior to deposition of the coating hereon; these are the colloid mill and the homogenizer. Both are commonly used in pigment technology and their particular design is not critical. Likewise, other equipment such as sand mills, ultrasonic energy mills, and the like, capable of providing the intense shearing action necessary to break down pigment agglomerates to the indicated degree prior to coating, may be used. The conditions of operation of the particular equipment may be varied over a considerable range. Thus, for instance, the illustrative examples show homogenization at either 5,000 p.s.i. or 8,000 p.s.i. However, this range can readily be extended from 1,000 p.s.i. to 10,000 p.s.i., the difference being that more passes of the slurry are required at the lower pressure to attain the same degree of dispersion and elimination of pigment agglomerates. The variations in operating conditions necessary to attain the herein-required degree of deagglomeration will be apparent to those skilled in the operation of such mills. The examples show that the quality of the product improves as the extent to which it is subjected to shearing action is increased.

The concentration of pigment in the slurry is not critical. However, it must be free flowing so as to guarantee ready passage through the homogenizer or other equipment intended to provide the intense shear. Excessive pigment concentration which may lead to such high consistency as to plug the apparatus should be avoided. Excessive dilution of the pigment slurry is undesirable from an economic standpoint and also because the effectiveness of homogenization, colloid-milling, etc., may be decreased at high dilution of the slurry. However, the method is still applicable even under those relatively less attractive conditions.

All of the examples have shown operation in aqueous systems only. However, liquids other than water may be used, as shown in Iler, U.S. Pat. No. 2,885,366. It is contemplated that any liquid shown by Iler to be usable for application of a coating of dense, amorphous silica to an insoluble core is usable in the improved processes of this invention.

All of the examples start with an already formed slurry of a lead chromate pigment. This may be attained by dispersing either the dry pigment or the corresponding aqueous presscake in water. It is desirable that the initial pigment slurry be essentially free of water-soluble raw material excesses, such as are normally washed out the manufacturing filtration step. Otherwise, they might complicate the subsequent pigment coating step as would be the case were excess lead ion to react with the added sodium silicate and precipitate lead silicate, thus interfering with the attainment of the desired continuous silica coating on the pigment.

In the examples the tests involving plastics applications have been restricted to polystyrene. It should be understood that the advantages of this invention are applicable also to other plastics, and are particularly evident in those cases where it is customary to premix the dry resin polymer, in granule form, with the pigment to insure uniformity prior to fluxing and injection molding. Thus, for example, the advantages are evident when the pigment is used for the coloration of polyethylene, polypropylene, and nylon. Also the improvements are readily apparent when the pigments are used for coloring other plastics, including:

"Delrin," acetal resin
"Dacron," polyester resin
"Tedlar," polyvinylfluoride resin
"Kralastic," ABS high impact resin.

Likewise, the improved thermal stability is evident when the coated pigment is heated in air in the absence of any plastic.

The products of the present invention retain the advantages of the improved, silica-coated lead chromate pigments of the above-mentioned U.S. Pat. No. 3,370,971, in that the pigments show greatly improved resistance to chemical attack and increased stability to heat and light by comparison with lead chromate pigments of the prior art. These improvements are manifested in the decreased sensitivity of the pigments to alkali, acid and sulfides. They are also evident in the improved resistance of the pigments to discoloration on exposure to light or to elevated temperatures, either when heated in air or when used as the colorants for molded plastics. The elimination of such previously recognized deficiencies in lead chromate pigments makes possible their more extensive use in various industries, such as paint, printing ink, plastics, floor covering, etc., where their previous utility was restricted.

It is particularly important to note that, whereas the application of the silica or silica-alumina coating as described in U.S. Pat. No. 3,370,971 often leads to a deterioration in certain properties (for example, rate of strength development in ink or gloss in paint), the improved products of the present invention retain the advantages of increased chemical and thermal stability, without significant deterioration in other important properties. In fact, the effectiveness of the coating treatment as determined by the degree of improvement in heat stability when the products are used for molding resins is markedly enhanced.

The following explanations of some of the specific advantages realized by this improvement follow readily from the results of tests performed:

1. Heat stability in high-temperature molding resins, wherein the dry pigment and dry granular resins are first subjected to mechanical mixing action prior to fluxing, is improved because the virtual absence of coated aggregates minimizes the extent to which uncoated particles of pigment are exposed by breakdown of the aggregates.
2. Strength and rate of strength development in ink are improved as a result of the virtual elimination of undesirable pigment aggregates which are known to adversely affect pigment texture.
3. The marked improvement in gloss is readily explainable by the elimination of oversized particles or aggregates, and possibly to some extent by the improved ease of dispersion of the pigment in the vehicle.

What is claimed is:

1. An improved lead chromate pigment resistant to abrasion and to discoloration upon contact with light, dilute acids, dilute alkalies, soap solutions and especially with molten thermoplastic resins in the temperature range of 220° to 320° C., said pigment consisting essentially of lead chromate pigment particles, no more than 10 percent of which have a size greater than $4.1\mu$ and at least 50 percent of which have a size less than $1.4\mu$, said particles having deposited on the surface thereof about from 2 to 40 percent by weight, based on the total product weight, of dense, amorphous silica as a substantially continuous film.

2. A composition of claim 1 in which the lead chromate pigment particles consist essentially of substantially pure monoclinic lead chromate.

3. A composition of claim 1 in which the lead chromate pigment particles consist essentially of a solid solution of lead chromate, lead sulfate and lead molybdate.

4. A composition of claim 1 in which the silica content is about 15 to 35 percent by weight, based upon the final product, said composition being resistant to darkening when heated in polyethylene or polystyrene to 300°–320° C.

5. A composition of claim 1 in which the silica content is about 10 to 25 percent based upon the final product, said composition being resistant to discoloration with strong acids when used in a coating composition.

6. A composition of claim 1 in which the lead chromate pigment particles consist essentially of a solid solution of lead chromate and lead sulfate, in monoclinic form.

7. A composition of claim 1 having up to about 2 percent by weight of alumina, based upon the total weight of the composition, deposited on the silica coating.

8. A composition of claim 1 wherein at least 80 percent of the lead chromate pigment particles have a size less than 1.4 microns.

9. In a process for producing a silica-coated lead chromate having improved resistance to (a) darkening when dispersed in thermoplastic resins at high temperatures, (b) discoloration upon contact with acids, alkalies, and soap solutions, and (c) abrasion, said process including the steps of (1) slurrying the lead chromate pigment particles in an aqueous medium and (2) depositing from 2 to 40 percent of dense, amorphous silica from an aqueous sodium silicate solution at a pH above 6 and a temperature above 60° C. upon the pigment particles while so slurried, the improvement which comprises subjecting the lead chromate pigment particles in the slurry to intense shear by passing the slurry through the orifice of a homogenizer at a pressure drop of 1,000–10,000 p.s.i. prior to deposition of the silica thereon, whereby no more than 10 percent of the particles have a size greater than $4.1\mu$ and at least 50 percent have a size less than $1.4\mu$.

10. A process of claim 9 in which the lead chromate pigment particles consist essentially of substantially pure monoclinic lead chromate.

11. A process of claim 9 in which the lead chromate pigment particles consist essentially of a solid solution of lead chromate, lead sulfate, and lead molybdate.

12. A process of claim 9 in which the lead chromate pigment particles consist essentially of a solid solution of lead chromate and lead sulfate, in monoclinic form.

13. A process of claim 9 in which the lead chromate pigment particles consist essentially of lead sulfochromate.

14. In a process for producing a coated lead chromate pigment having improved resistance to (a) darkening when dispersed in thermoplastic resins at high temperatures, (b) discoloration upon contact with acids, alkalies, and soap solutions, and (c) abrasion, said process including the steps of (1) slurrying the lead chromate pigment particles in an aqueous medium, (2) depositing from 2 to 40 percent of dense, amorphous silica from an aqueous sodium silicate solution at a pH above 6 and a temperature above 60° C. upon the pigment particles while so slurried, and (3) adding an aqueous solution of an aluminum-containing compound to the resulting suspension of silica-coated lead chromate particles with continued heating above 60° C. whereby alumina is deposited on the silica coating, the improvement which comprises subjecting the lead chromate pigment particles in the slurry to intense shear by passing the slurry through the orifice of a homogenizer at a pressure drop of 1,000–10,000 p.s.i. prior to deposition of silica thereon, whereby no more than 10 percent of the chromate particles prior to the deposition of silica thereon have a size greater than $4.1\mu$ and at least 50 percent have a size less than $1.4\mu$.

* * * * *